United States Patent
Toya

(10) Patent No.: US 9,634,768 B2
(45) Date of Patent: Apr. 25, 2017

(54) OPTICAL COMMUNICATION DEVICE AND METHOD OF CONTROLLING OPTICAL MODULATOR

(71) Applicant: Fujitsu Optical Components Limited, Kawasaki-shi, Kanagawa (JP)

(72) Inventor: Akihiro Toya, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 116 days.

(21) Appl. No.: 14/811,940

(22) Filed: Jul. 29, 2015

(65) Prior Publication Data

US 2016/0056897 A1     Feb. 25, 2016

(30) Foreign Application Priority Data

Aug. 22, 2014  (JP) .................................. 2014-169158

(51) Int. Cl.
    *H04B 10/2507*    (2013.01)
    *H04B 10/50*      (2013.01)
(52) U.S. Cl.
    CPC .............................. *H04B 10/50575* (2013.01)
(58) Field of Classification Search
    CPC ............ H04B 10/50575; H04B 10/505; H04B 10/50572; H04B 10/50595; G02F 1/0123; G02F 2001/212; G02F 1/2255; G02F 1/2257
    USPC .......................................................... 398/183
    See application file for complete search history.

(56) References Cited

U.S. PATENT DOCUMENTS

| | | | |
|---|---|---|---|
| 2001/0007508 A1* | 7/2001 | Ooi ....................... | G02F 1/0123 359/245 |
| 2005/0254743 A1 | 11/2005 | Akiyama et al. | |
| 2012/0155880 A1* | 6/2012 | Nishimoto ....... | H04B 10/50572 398/79 |
| 2013/0051723 A1* | 2/2013 | Sudo ..................... | G02F 1/0123 385/3 |
| 2014/0168741 A1* | 6/2014 | Li ......................... | G02F 1/0123 359/239 |

(Continued)

FOREIGN PATENT DOCUMENTS

| | | |
|---|---|---|
| JP | 2005-326548 | 11/2005 |
| JP | 2012-257164 | 12/2012 |

OTHER PUBLICATIONS

Patent Abstracts of Japan, Publication No. 2012-257164, published Dec. 27, 2012.

(Continued)

*Primary Examiner* — Don N Vo
(74) *Attorney, Agent, or Firm* — Staas & Halsey LLP

(57) ABSTRACT

An optical communication device has a Mach-Zehnder optical modulator; a monitor configured to monitor a modulated light output from the optical modulator; a first controller configured to set a substrate bias voltage or an amplitude of a drive signal applied to the first waveguide of a waveguide pair of the optical modulator to a desired level that provides a first modulation index; and a second controller configured to control a substrate bias voltage or an amplitude of the drive signal applied to the second waveguide of the waveguide pair based upon an output signal from the monitor such that a second modulation index for the second waveguide becomes the same or closer to the first modulation index set for the first waveguide.

9 Claims, 13 Drawing Sheets

(56) References Cited

U.S. PATENT DOCUMENTS

2014/0334829 A1* 11/2014 Akiyama .............. G02F 1/0123
398/186

OTHER PUBLICATIONS

Patent Abstracts of Japan, Publication No. 2005-326548, published Nov. 24, 2005.

* cited by examiner

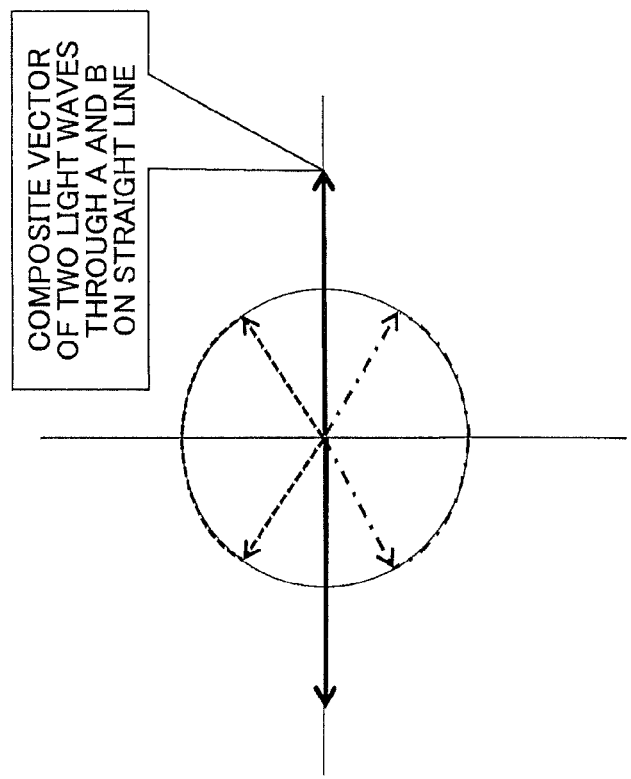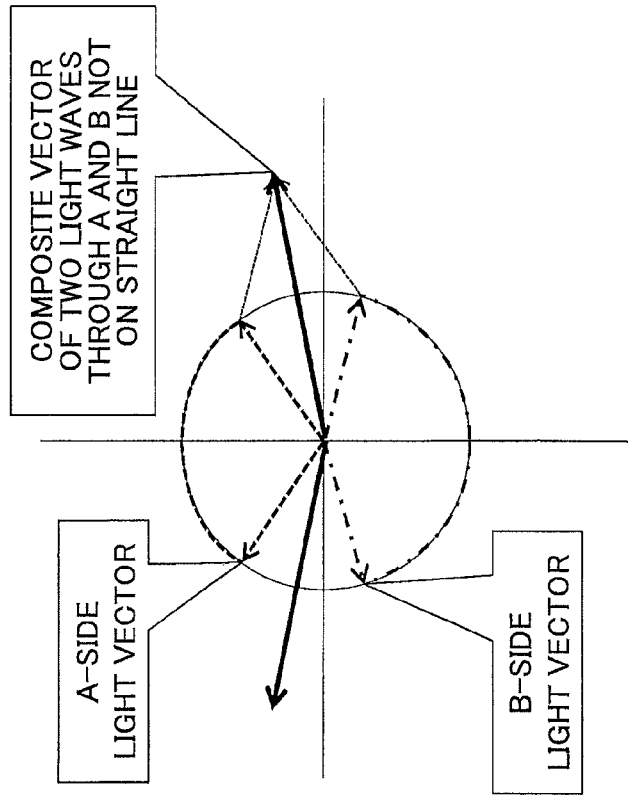

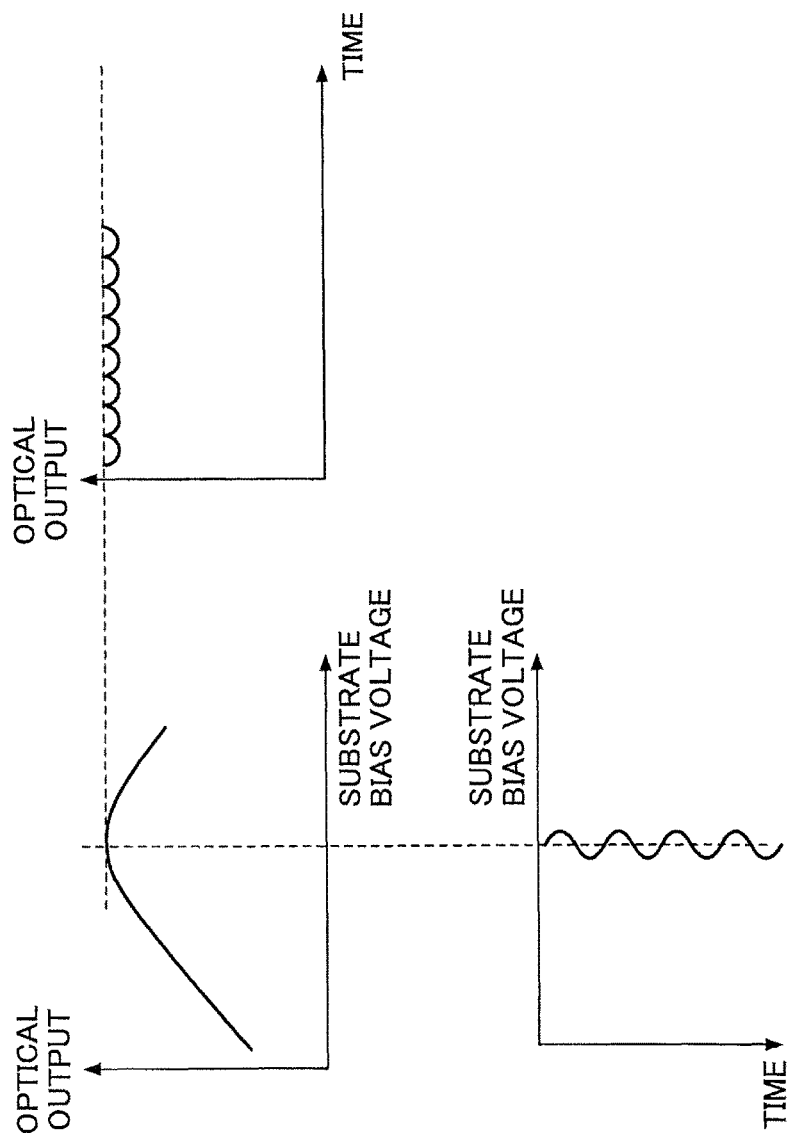

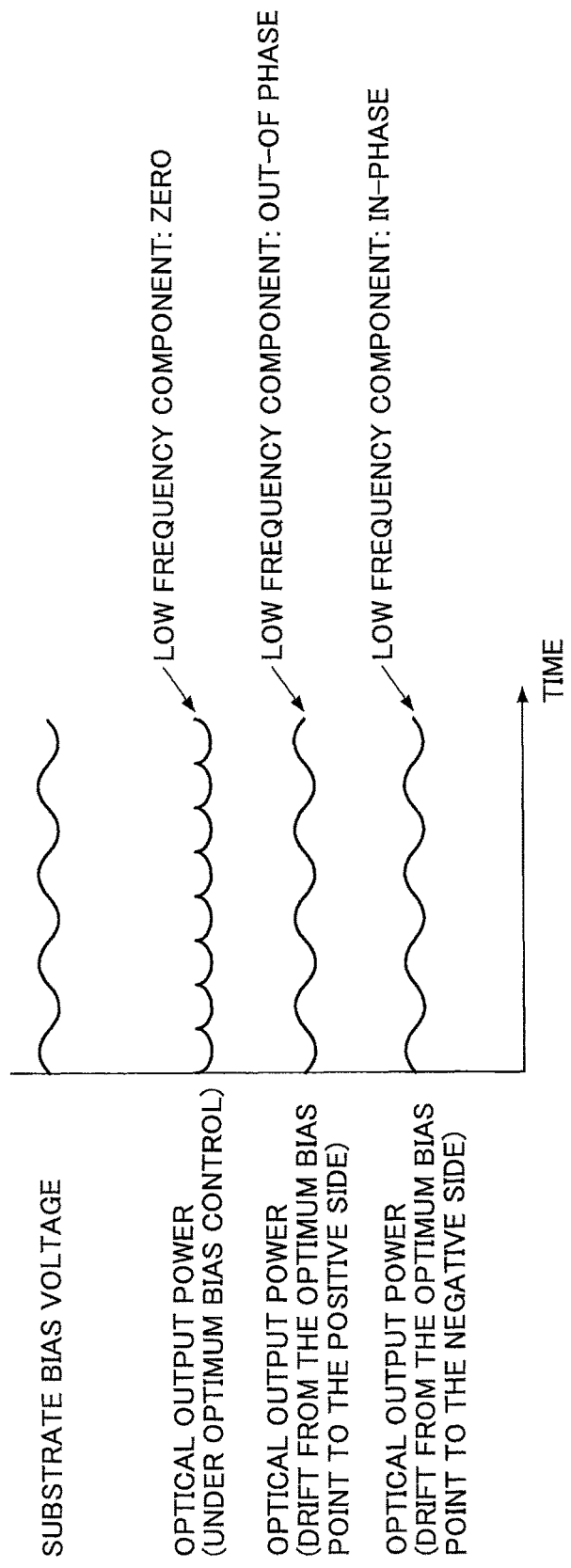

LIGHT WAVES WITH SAME MODULATION INDEXES BETWEEN WAVEGUIDES A AND B

LIGHT WAVES WITH DIFFERENT MODULATION INDEXES BETWEEN WAVEGUIDES A AND B

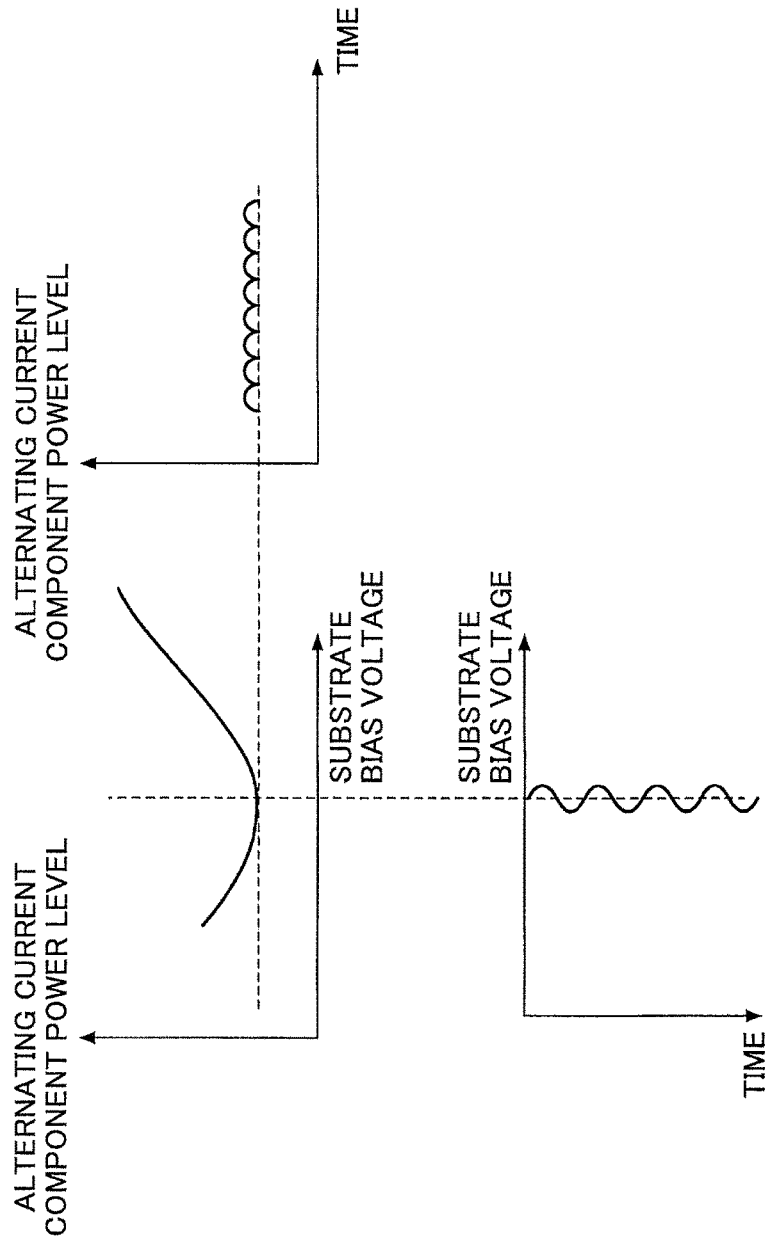

OPTICAL COMMUNICATION DEVICE AND METHOD OF CONTROLLING OPTICAL MODULATOR

CROSS-REFERENCE TO RELATED APPLICATIONS

This application is based upon and claims the benefit of priority of the prior Japanese Patent Application No. 2014-169158 filed on Aug. 22, 2014, which is incorporated herein by references in its entirety.

FIELD

The disclosures herein relate to controlling of a modulation index (or a modulation depth) of an optical modulator used in a fiber optic communication system.

BACKGROUND

In recent years, 100 Gigabit-per-second (Gbs) long-distance optical transmission has been implemented by dual-polarization quadrature phase-shift keying (DP-QPSK) using a digital coherent technology. To further improve transmission capacity, greater-level modulation schemes such as polarization division multiplexed 16 quadrature amplitude modulation (16-QAM) are being developed. Nyquist wavelength division multiplexing (WDM) is also being developed to increase the transmission rate, which technique transmits data on more wavelength channels by narrowing the channel spacing using a square-shaped transmission spectrum.

Meanwhile, demand for reducing the size of optical transceiver, which is used as a frontend module of optical transmission systems, is increasing. At present, Lithium niobate ($LiNbO_3$) Mach-Zehnder interferometer is typically used as an electro-optic modulator. In order to reduce a device size, it is desired to actualize multilevel modulation (e.g., DP-QPSK, DP-16QAM, etc.) using a semiconductor Mach-Zehnder interferometer.

There is an intrinsic problem in semiconductor optical modulators that the modulation characteristic (i.e., the relationship between applied voltage and optical phase change) varies depending on the wavelength of light input to the modulator. In semiconductor optical modulators, the absorption edge wavelength of the semiconductor material changes according to applied voltage, and the phase of light is modulated making use of the phase shift due to absorption based on Kramers-Kronig relations. Hence, semiconductor optical modulators have wavelength dependency such that the closer to the absorption-edge-wavelength the light to be modulated is, the greater the phase change with respect to the voltage change.

To address the wavelength dependency of the modulation characteristic of semiconductor optical modulators, several techniques for controlling a substrate bias voltage or amplitude of a drive signal according to the wavelength of input light are proposed. The first technique is to set the substrate bias voltage to a predetermined level according to the wavelength, and drive the modulator at a constant amplitude of a drive signal regardless of the wavelength. See, for example, Japanese Laid-open Patent Publication No. 2005-326548 A.

The second technique is to perform feedback control on the substrate bias voltage or drive signal amplitude. A low frequency signal is superimposed on driving data signals, and output light signals are monitored. Responsive to the monitoring result, the substrate bias voltage and/or the amplitude of the modulator drive signal is controlled. See, for example, Japanese Laid-open patent publication No. 2012-257164 A.

In some modulation schemes, the modulation index or the modulation depth of an optical modulator needs to be set to an arbitrary level at or under 100%. However, semiconductor Mach-Zehnder modulators have a problem that the voltage-to-phase characteristic, or the wavelength characteristic, or the driving amplitude varies between the waveguide pair of the Mach-Zehnder interferometer. The voltage-to-phase characteristic may also change differently with time between the two waveguides.

It is desired for fiber optic communication systems to control the modulation index to an arbitrary level and maintain the optimum condition for modulation even if characteristics fluctuate or change differently with time between the two waveguides of a Mach-Zehnder interferometer.

SUMMARY

According to an aspect of the disclosures, an optical communication device has an optical modulator having a Mach-Zehnder interferometer with a pair of waveguides, a monitor configured to monitor a modulated light output from the optical modulator, a first controller configured to set a first substrate bias voltage or an amplitude of a first drive signal applied to a first waveguide of the waveguide pair of the optical modulator to a level that provides a first modulation index, and a second controller configured to control a second substrate bias voltage or an amplitude of a second drive signal applied to a second waveguide of the waveguide pair of the optical modulator, based upon an output signal from the monitor, such that a second modulation index for the second waveguide becomes the same or closer to the first modulation index set for the first waveguide.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 1A and FIG. 1B illustrate a basic idea of bringing modulation indexes of a waveguide pair of a Mach-Zehnder interferometer to be consistent with each other;

FIG. 3A and FIG. 3B are diagrams to explain feedback control on a substrate bias voltage;

FIG. 6A and FIG. 6B are diagrams to explain feedback control according to the second embodiment;

DESCRIPTION OF EMBODIMENTS

Figure 2:
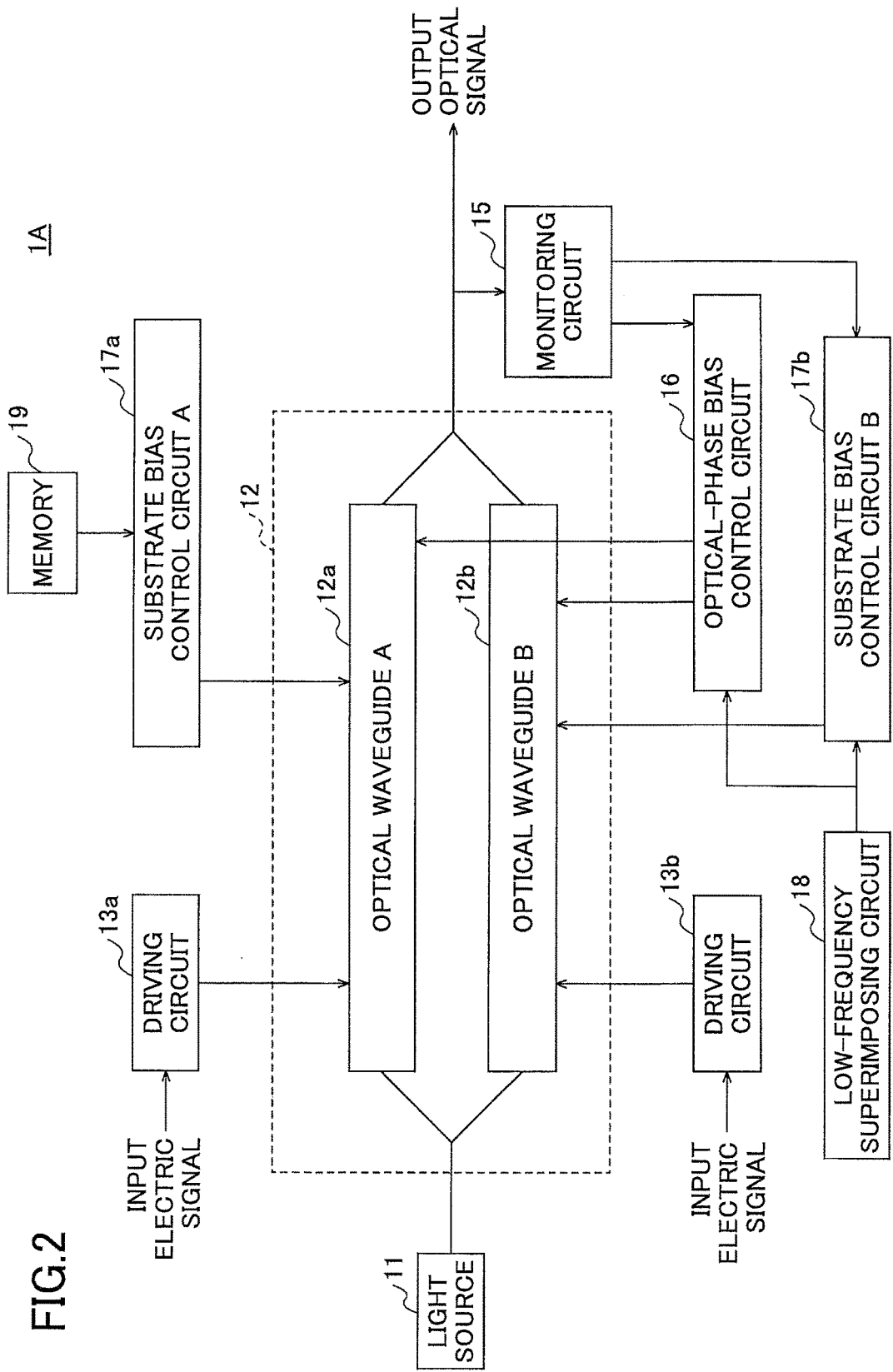
FIG. 2 is a schematic diagram of an optical transmitter according to the first embodiment.

With the first technique described above in which the substrate bias voltage is set to a fixed level according to the wavelength, the modulation characteristic is likely to deviate from the optimum condition. Such deviation occurs when the amplitude of a drive signal output from a driving circuit is influenced by a temperature change or other changes, or when a modulation characteristic itself changes with time. Because the two waveguides of a Mach-Zehnder interferometer are driven by a driving waveform with the same amplitude under application of the same substrate bias voltage, non-uniformity in characteristics or different degrees of change with time between two waveguides cannot be corrected.

The second technique described above is a technique for controlling the modulation index to 100%, and it is not adapted to set the modulation index to an arbitrary level. Besides, as in the first technique, the waveguides of the Mach-Zehnder interferometer are driven at the same amplitude of a drive signal, under application of the same substrate bias voltage. When the modulation characteristic varies or undergoes different change with time between the pair of waveguides, the phase modulation deviates from the optimum condition.

In some occasions, the modulation index of an optical modulator is set to a desired value under 100% depending on a modulation scheme, as listed below.

(1) The average modulation index is reduced from 100% in order to bring the peak level of the waveform under 100%. This may happen during Nyquist pulse modulation because of large overshoot generated in the driving waveform.

(2) The modulation index is reduced to guarantee the linearity in the voltage-to-phase relationship. It is desired for Nyquist pulse modulation or multilevel quadrature phase modulation (such as 16 QAM) to have linearity in the voltage-to-phase relationship. However, in semiconductor optical modulators, the voltage-to-phase relationship is typically non-linear. To ensure the linearity, the modulation index is reduced.

The embodiments provide a modulation index of an arbitrary level, while maintaining the output power level of a Mach-Zehnder optical modulator at the maximum. This is implemented by setting the modulation index of a light beam propagating through one of a pair of the waveguides of a Mach-Zehnder interferometer to a desired value, and bringing the modulation index of a light beam propagating through the other of the waveguides consistent with or closer to the modulation index of the light beam on said one of the waveguides. This arrangement may be expressed as a combination of feed-forward control on the first waveguide according to the wavelength of the light source and feedback control on the second waveguide. The consistency of the modulation indexes between the two waveguides is implemented by controlling the substrate bias voltage or the amplitude of drive signals applied to the optical waveguides. The details of bias control and amplitude control are described below.

FIG. 1A and FIG. 1B illustrate a basic idea of bringing the modulation indexes of waveguides of a Mach-Zehnder interferometer to be consistent with each other. As illustrated in FIG. 1A, if the modulation indexes of light beams differ between two waveguides (for example, 70% on waveguide A and 80% on waveguide B), the composite vector of the light vector on the waveguide A and the light vector on the waveguide B is not on a straight line. In this case, the 0 to π phase modulation efficiency of the Mach-Zehnder optical modulator decreases.

In contrast, if the modulation indexes of light beams through the waveguides are similar to each other (for example, 60% on both waveguides) as illustrated in FIG. 1B, the composite vector of light vectors on the waveguide pair is on the straight line. In this case, phase modulation between 0 radians and π radians is correctly carried out.

In the following embodiments, explanation is made of optical communication devices configured to have a modulation index of a desired value, while maintaining the optimum output power level.

First Embodiment

FIG. 2 is a schematic diagram of an optical transmitter 1A, which is an example of an optical communication device, according to the first embodiment. In the first embodiment, the modulation index is controlled to an arbitrary level at the maximum output power level by controlling substrate bias voltages applied to a pair of waveguides of a Mach-Zehnder optical modulator.

The optical transmitter 1A has a light source 11, a Mach-Zehnder optical modulator 12 (hereinafter, which may be referred to simply as "optical modulator 12"), and driving circuits 13a and 13b for driving the optical modulator 12. The light source 11 is, for example, a wavelength-tunable semiconductor laser suitable for use in WDM transmission systems. The optical modulator 12 has a pair of waveguides 12a and 12b. The amount of phase change of light beams in the waveguides 12a and 12b varies depending on the substrate bias voltage.

The light emitted from the light source 11 is guided to the optical modulator 12, and branched into the waveguides 12a and 12b. The driving circuits 13a and 13b amplify input electric signals and output high-frequency (e.g., 32 Gbs) drive signals to modulate the light beams propagating through the waveguides 12a and 12b, respectively. In the exemplified structure of FIG. 2, the amplitudes of the drive signals are set to a fixed level. The light beams having undergone the phase modulation at the waveguides 12a and 12b are combined and the light interfered with each other is output from the optical modulator 12. Substrate bias control circuits 17a and 17b are provided for the waveguide 12a and 12b, respectively. The substrate bias control circuit 17a controls the substrate bias voltage applied to the waveguide 12a, and the substrate bias circuit 17b controls the substrate bias voltage applied to the waveguide 12b, independently from each other. In FIG. 2, electrodes to which high-frequency drive signals and direct-current (DC) substrate biases are applied are omitted.

The substrate bias voltage circuit 17a reads a predetermined bias value from a memory 19 and controls the substrate bias voltage to be applied to the waveguide 12a. The memory 19 stores a table or a relational expression describing the relationship between modulation index and substrate bias level for each wavelength.

The substrate bias control circuit 17b performs feedback control on the substrate bias voltage applied to the waveguide 12b so as to bring the modulation index of the light beam traveling through the waveguide 12b to be consistent with the modulation index of the light beam traveling through the waveguide 12a. To be more precise, a low frequency signal is superimposed on the substrate bias voltage applied by the substrate bias control circuit 17b to the waveguide 12b. The output of the optical modulator 12 is monitored, and the substrate bias voltage for the waveguide 12b is controlled such that the low frequency component contained in the monitor output is minimized. The frequency of the low frequency signal generated by the low frequency superimposing circuit 18 is sufficiently low (for example, several kilohertz), compared with the frequency of the drive signal.

The substrate bias is a bias voltage that defines the operating point of the optical modulator 12 corresponding to the center of the amplitude of the drive signal. In semiconductor optical modulators, the phase modulation index can be controlled by changing the substrate bias voltage to vary the phase modulation efficiency. This is explained with reference to FIG. 3.

A portion of the output light (i.e., the combined light) of the optical modulator 12 is monitored at a monitoring circuit 15. The monitored light is converted into an electric signal and supplied as a monitor signal to the substrate bias control circuit 17b. The substrate bias control circuit 17b compares the phase of the low frequency component contained in the monitor signal with the phase of the low frequency signal generated by the low-frequency superimposing circuit 18, and controls the substrate bias voltage in a direction that the magnitude of the low frequency component in the monitor signal is approaching zero.

The output of the monitoring circuit 15 is also supplied to an optical-phase bias control circuit 16. The optical-phase bias control circuit 16 controls a phase bias voltage applied to the waveguide 12b such that the low frequency component contained in the monitor signal approaches zero. The phase bias voltage is a voltage that defines the static phase difference between the light beams modulated at the waveguides 12a and 12b. In optical phase modulation, the phase bias voltage is controlled such that the center of the amplitude of the drive signal approaches the minimum point of the modulation curve (i.e., the voltage to light intensity characteristic curve) of the optical modulator 12. By controlling the phase bias voltage so as to minimize the monitored low frequency component, the center of the amplitude of drive signal is brought to the minimum point of the modulation curve.

Now, controlling of the modulation index is explained. In a modulator configured to modulate the light phase making use of the phase shift due to absorption of the electric field, the modulation efficiency increases as the applied substrate bias voltage is raised. However, the absorption loss also increases. In the embodiment, a control scheme that brings the modulation index to a desired level, while minimizing the absorption loss, is provided as described below.

First, a substrate bias that maximizes the output power level of the optical modulator 12 at a desired modulation index is determined from the voltage to phase (or absorption) characteristic of the optical modulator 12. The determined substrate bias is set to the first waveguide 12a.

Then, a substrate bias voltage to be applied to the second waveguide 12b is feedback-controlled so as to maximize the output power level of the optical modulator 12. The substrate bias voltage for the second waveguide 12b is controlled such that the same modulation index as that fixed for the first waveguide 12a is acquired for the second waveguide 12b. If the modulation index of the waveguide 12b is less than that of the waveguide 12a, the amplitude of the electric field of the combined light becomes smaller than that acquired in the case with the same modulation indexes. Consequently, the output power level of the optical modulator 12 decreases. If the modulation index of the waveguide 12b becomes greater than that of the waveguide 12a as a result of increasing the substrate bias of the waveguide 12b, the output power level of the optical modulator 12 again decreases due to the increased absorption loss. The maximum point of the output power level of the optical modulator 12 indicates that the modulation indexes become the same between the pair of the waveguides 12a and 12b.

To maximize the output power level of the optical modulator 12, the substrate bias voltage applied to the waveguide 12b is slightly modulated by the low frequency signal and the low frequency component contained in the output light (average power level) is monitored. The substrate bias voltage is controlled so as to minimize the low frequency component. Alternatively, the power of the output light of the optical modulator may be monitored directly. In this case, the substrate bias voltage is controlled so as to maximize the power.

FIG. 3A and FIG. 3B are diagrams to explain the feedback control on a substrate bias voltage, namely, the feedback control on the modulation index using a low frequency signal according to the first embodiment. In the first embodiment, the substrate bias voltage is controlled so as to maximize the output power level of the optical modulator. The modulation characteristic (the amount of phase change with respect to the applied voltage) of a semiconductor optical modulator can be controlled by changing the substrate bias voltage. In binary or quadrature phase shift keying, the light phase is modulated between 0 radians and π radians using a Mach-Zehnder interferometer in the optical modulator 12. The voltage required to change the phase between 0 radians and π radians is named a "Vπ" voltage.

As illustrated in the upper left of FIG. 3A, the output power level becomes the maximum at the optimum bias voltage. In this case, the waveform of the low frequency component applied to the substrate bias is folded back, and a frequency twice the superimposed low frequency is detected as illustrated in the right-hand side of FIG. 3A. The superimposed low frequency itself is not detected, and accordingly, the magnitude of the low frequency component in the monitor signal becomes the minimum (or zero). If the modulation index of waveguide B (12b) is greater than that of the waveguide A (12a), the output power level shifts to the positive side from the optimum bias point, and a 180-degree out-of-phase component of the low frequency signal is detected, as illustrated in FIG. 3B. If the modulation index of waveguide B (12b) is less than that of the waveguide A (12a), the output power level shifts to the negative side from the optimum bias point, and a low frequency in-phase component is detected.

By controlling the substrate bias voltage for the waveguide B (12b) so as to minimize the low frequency component in the monitor signal, the output power level is maximized and the phase modulation index of the light beam propagating through the waveguide B (12b) is made consistent with that of the light beam propagating through the waveguide A (12a). Even if the voltage-to-phase characteristic of the waveguides B changes with time, the phase modulation index of the waveguide B is always brought to the same level as the phase modulation index of the waveguide A under the feedback control.

The same applies to the modulation index of waveguide A. Even if the voltage-to-phase characteristic of waveguide A defined by a fixed substrate bias voltage changes with time, the modulation indexes of the waveguide A and waveguide B are always brought to be the same under the feedback control. In this case, the modulation index of the optical modulator 12 varies slightly corresponding to the change with time. However, because the phase modulation indexes are maintained the same between the two waveguides A and B, phase distortion due to asymmetric phase modulation can be avoided.

Under the above-described control, the modulation index of the optical modulator 12 can be set to an arbitrary level, while keeping the output power level the maximum. Even if the voltage-to-phase characteristic varies or undergoes different changes with time between the waveguide A and waveguide B, the optimum modulation condition is achieved. With this arrangement, Nyquist-WDM or multi-level quadrature amplitude modulation (such as 16-QAM or 64-QAM) can be implemented in a stable manner by a compact-size semiconductor optical modulator.

Second Embodiment

Figure 4:
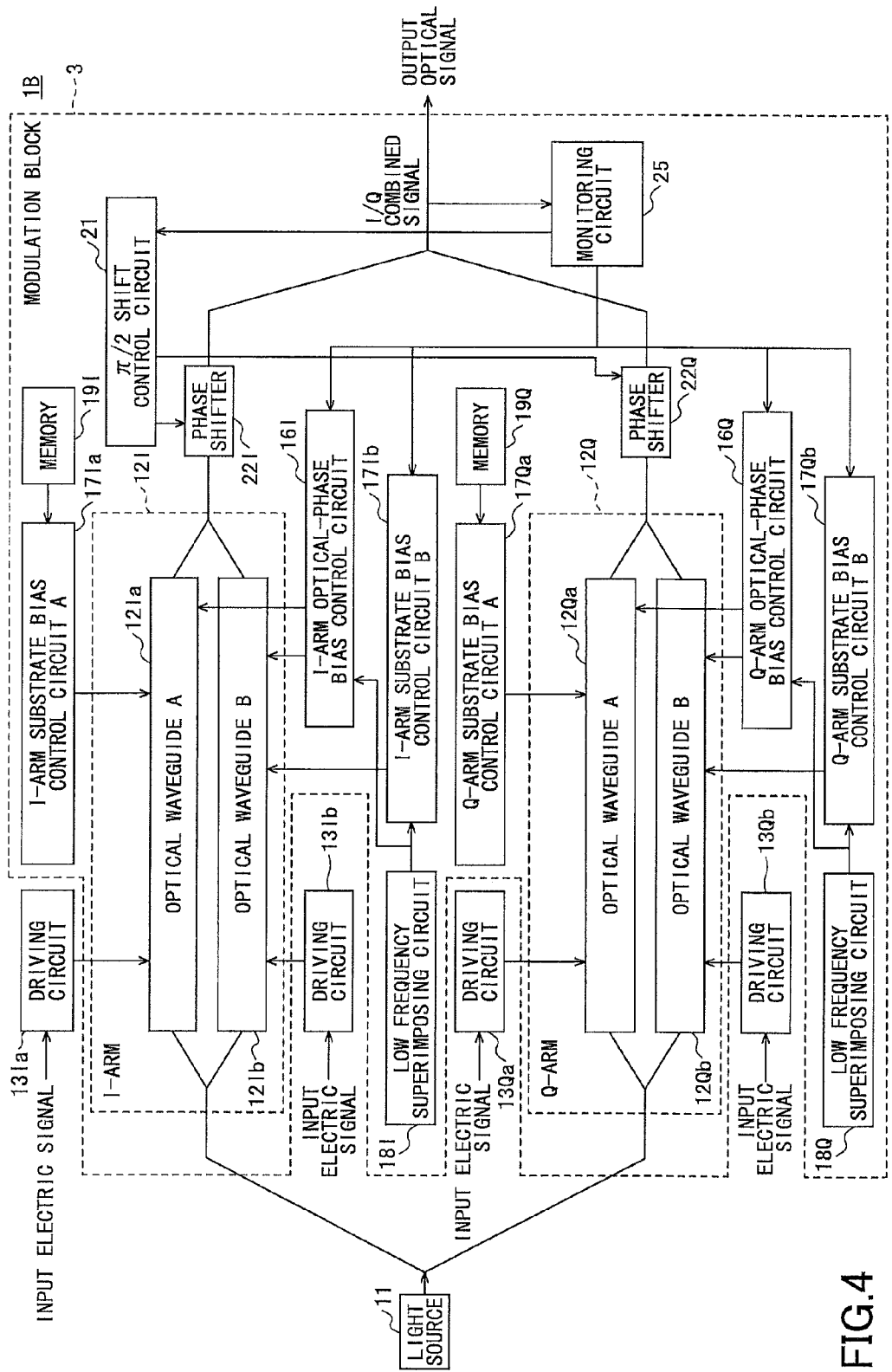
FIG. 4 is a schematic diagram of an optical transmitter according to the second embodiment.

FIG. 4 is a schematic diagram of an optical transmitter 1B, which is an example of an optical communication device, according to the second embodiment. In the second embodiment, the substrate bias voltage applied to one of the waveguide pair of the optical modulator is set to a fixed level that defines a desired modulation index, and the substrate bias voltage applied the other of the waveguide pair is feedback-controlled so as to minimize the alternative current component contained in the output light.

The optical transmitter 1B is used for quadrature phase shift keying (QPSK) or quadrature amplitude modulation (QAM). The optical transmitter 1B has an in-phase (I) arm and a quadrature-phase (Q) arm of Mach-Zehnder interferometers. The light emitted from the light source 11 is split into two paths and guided to the Mach-Zehnder optical modulator 12I (which may be referred to simply as "I-arm modulator 12I") and the Mach-Zehnder optical modulator 12Q (which may be referred to simply as (Q-arm modulator 12Q) of a modulation block 3. In each of the I-arm modulator 12I and the Q-arm modulator 12Q, the input light is split into two paths and guided to waveguide A and waveguide B. The output light beam from the I-arm modulator 12I and the output light beam from the Q-arm modulator 12Q undergo phase adjustment at a phase shifter 22I and a phase shifter 22Q, respectively, so as to produce a phase difference of $\pi/2$ radians (i.e., 90 degrees) between the light beams from the I-arm modulator 12I and the Q-arm modulator 12Q. The light beams with $\pi/2$ phase difference are combined and output from the modulation block 3.

A portion of the combined light containing the in-phase (I) component and the quadrature-phase (Q) component is monitored at a monitoring circuit 25. The monitoring result is supplied to a $\pi/2$ shift control circuit 21, optical-phase bias control circuits 16I and 16Q, and substrate bias control circuits 17Ib and 17Qb.

In the I-arm modulator 12I, high-frequency drive signals output from driving circuits 13Ia and 13Ib are applied to the waveguides 12Ia and 12Ib, respectively, to modulate the light beams at a high speed. In the Q-arm modulator 12Q, high-frequency drive signals output from driving circuits 13Qa and 13Qb are applied to the waveguides 12Qa and 12Qb, respectively, to modulate the light beams at a high speed. Both the I-modulator 12I and the Q-modulator 12Q are semiconductor optical modulators, such as indium phosphide (InP) modulators. Upon application of a voltage, the absorption edge wavelength of the semiconductor material changes, and the light phase is modulated making use of a phase shift due to the absorption according to Kramers-Kronig relations. The combined light containing the output from the I-arm modulator 12I and the output from the Q-arm modulator 12Q with $\pi/2$ phase difference is a light beam having undergone quadrature phase shift keying.

As in the first embodiment, in each of the I-arm modulator 12I and the Q-arm modulator 12Q, a substrate bias applied to one of the waveguide pair, for example, waveguide A is controlled to a fixed level that defines a desired modulation index by a substrate bias control circuit A (i.e., each of the bias control circuits 17Ia and 17Qa). In the configuration of FIG. 4, memories 19I and 19Q are provided corresponding to the I-arm substrate bias control circuit 17Ia and the Q-arm substrate bias control circuit 17Qa. However, a value stored in a memory 19 may be used to control the modulation index of waveguide A. A substrate bias voltage for the other of the two waveguides, e.g., waveguide B is feedback-controlled by substrate bias control circuit B (each of the substrate bias control circuits 17Ib and 17Qb). The method of the feedback control is different from the first embodiment. In the second embodiment, the substrate bias voltage is controlled such that an alternating current component contained in the I/Q combined light signal is minimized by monitoring a superimposed low frequency component.

On the I-arm side, a low frequency signal is supplied from a low frequency superimposing circuit 18I to the I-arm substrate bias control circuit 17Ib and an I-arm optical-phase bias control circuit 16I. The I-arm substrate bias control circuit 17Ib slightly modulates a substrate bias voltage for the waveguide 12Ib with the low frequency signal. Similarly, on the Q-arm side, a low frequency signal is supplied from a low frequency superimposing circuit 18Q to the Q-arm substrate bias control circuit 17Qb and a Q-arm optical-phase bias control circuit 16Q. The Q-arm substrate bias control circuit 17Qb slightly modulates a substrate bias voltage for the waveguide 12Qb with the low frequency signal. A single low frequency superimposing circuit 18 may be used in common between the I-arm modulation and Q-arm modulation.

A portion of the combined light containing I-phase modulated light and Q-phase modulation light is input as a monitor light to the monitoring circuit 25. The monitor light is converted to an electric current and then converted into a monitor signal representing a power value of the alternating current component. The power value is, for example, a square of the alternating current. Each of the substrate bias control circuits 17Ib and 17Qb carries out synchronous detection on the low frequency component contained in the monitor signal (i.e., contained in the alternating current component). If the modulation indexes of the waveguides A and B are consistent with each other, the power level of the alternating current component becomes the minimum, and the detected low frequency component approaches zero. If the modulation indexes of the two waveguides A and B are offset from each other, then the power level of the alternating current component increases and the low frequency component is detected. Depending on the offset direction of the modulation index of waveguide B with respect to the modulation index of waveguide A, the phase of the detected low frequency component is reversed. Accordingly, the direction and magnitude for controlling the substrate bias voltage can be known.

Each of the optical-phase bias control circuits 16I and 16Q controls a phase bias voltage based upon the detection of the low frequency component. The phase bias voltage is slightly modulated by the low frequency signal, and the phase bias voltage is controlled to bring the low frequency component contained in the monitor signal closer to zero. Under this phase bias control, the phase difference between the light beams on the two waveguides A and B of a Mach-Zehnder interferometer is adjusted.

Although some connection lines are omitted in FIG. 4 for the purpose of simplification, the low frequency signal may be supplied from the low frequency superimposing circuit 18I or 18Q to a $\pi/2$ shift control circuit 21. The $\pi/2$ shift control circuit 21 slightly modulates a $\pi/2$ phase shift bias voltage with the low frequency signal, and controls the $\pi/2$ shift bias voltage so as to bring the low frequency component contained in the alternating current component of the monitor signal closer to zero. The substrate bias, the optical-phase bias, and the $\pi/2$ shift bias may be controlled independently and in parallel using separate circuits, or alternatively, time sharing control may be performed using a CPU.

Figure 5B:
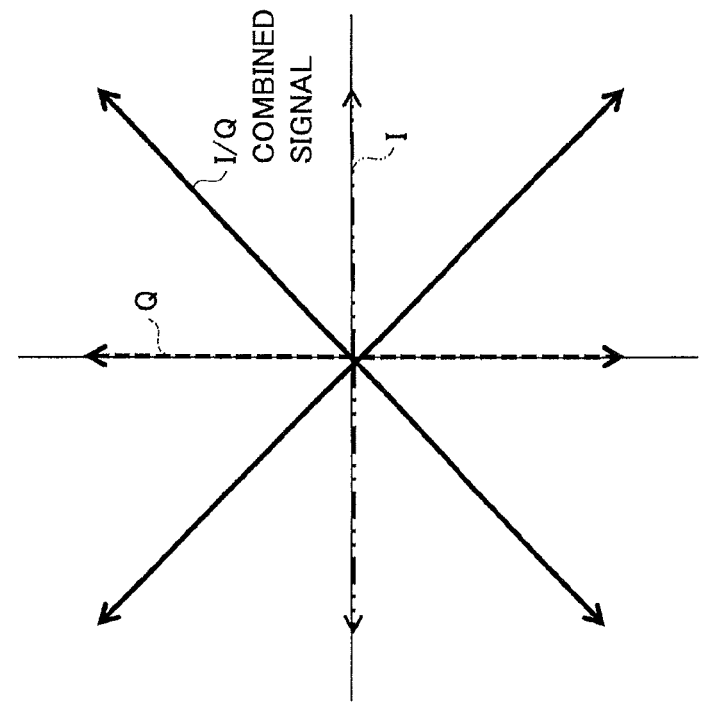
FIG. 5A and FIG. 5B illustrate a basic idea of bringing the modulation indexes of the waveguide pair to be consistent with each other for QPSK or multilevel QAM.
Figure 5A:
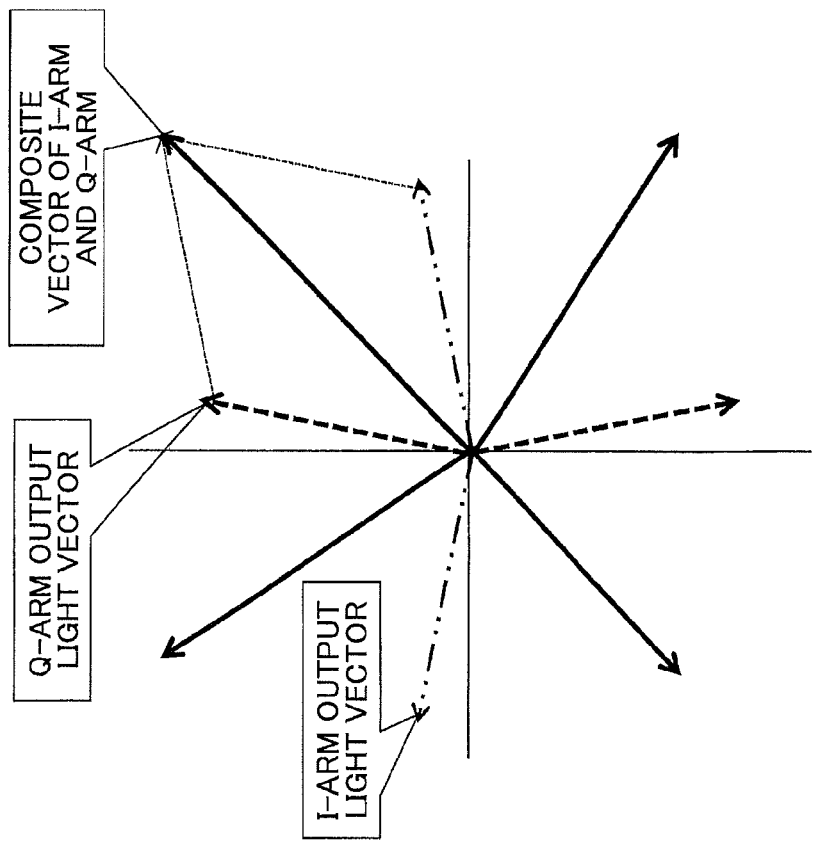

FIG. 5A and FIG. 5B illustrate a basic idea of controlling the modulation indexes of the optical transmitter 1B of FIG. 4. As illustrated in FIG. 5A, if the modulation indexes of the light beams travelling through the pair of waveguide A and waveguide B are different from each other, the phase relation between 0 radians and $\pi$ radians varies in the I-arm, and the phase relation between $\pi/2$ radians and $3\pi/2$ radians varies in the Q-arm. As a result, the combined light of the I-arm output and the Q-arm output deviates from the points of these four phases on the signal constellation, and the light intensity varies between the four points. This situation corresponds to a case where the amount of alternating current component contained in the I/Q combined light is greater than the minimum.

In contrast, as illustrated in FIG. 5B, if the modulation indexes of the light beams propagating through the waveguide A and the waveguide B are the same, orthogonality between the I-arm output light and the Q-arm output light is maintained. In the combined output light, the light intensity becomes even at the four phase points on the signal constellation. In this case, the alternating current component contained in the I/Q combined light is the minimum.

Figure 6B:
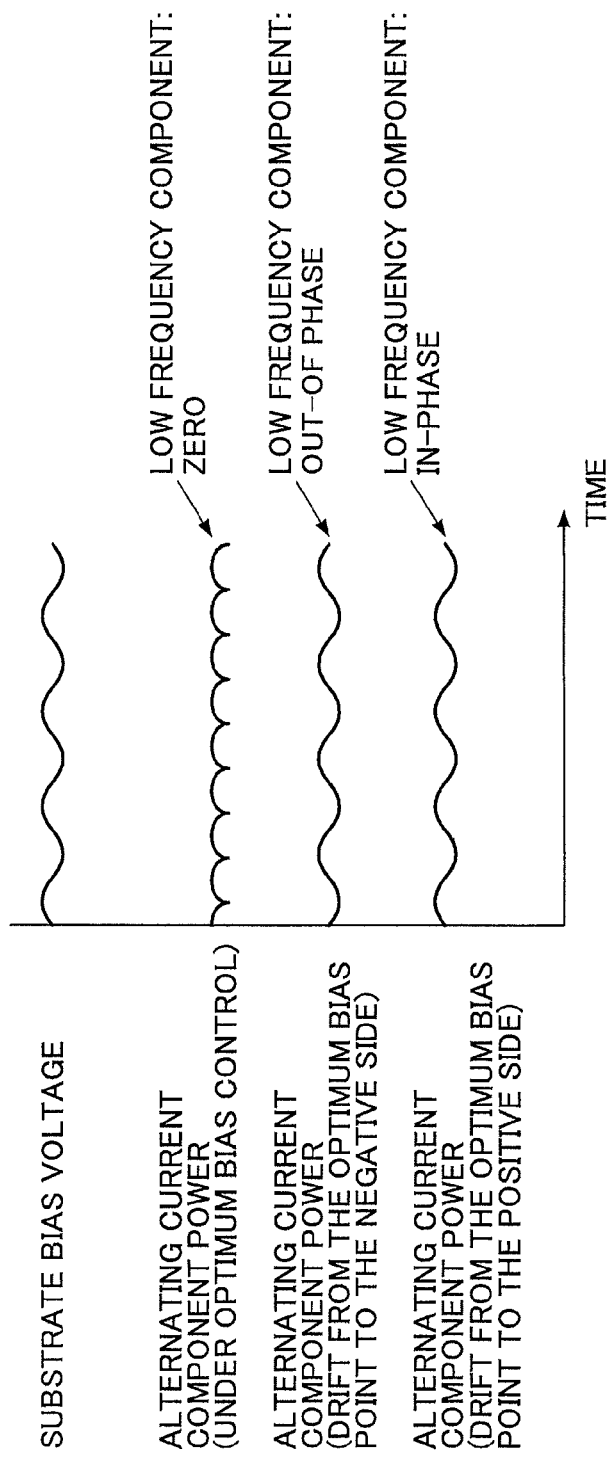

FIG. 6A and FIG. 6B are diagrams to explain the feedback control for minimizing the alternating current component according to the second embodiment. As illustrated in the upper left of FIG. 6A, the power of the alternative current component becomes the minimum at the optimum bias voltage. In this case, the waveform of the low frequency component applied to the substrate bias is folded back, and a frequency twice the superimposed low frequency is detected as illustrated in the right-hand side of FIG. 6A. In this case, the magnitude of the low frequency component in the monitor signal becomes the minimum (or zero). If the alternating current component increases, shifting from the optimum bias point to the positive side, a low frequency component in-phase with the applied low frequency signal is detected (FIG. 6B). If the alternating current component increases, shifting from the optimum bias point to the negative side, a low frequency component 180-degree out-of-phase with the applied low frequency signal is detected (FIG. 6B).

By monitoring the power level of the alternating current component in the I/Q combined output light and controlling the substrate bias voltage (i.e., the modulation index) so as to minimize the power of the alternating current component, the maximum output power level is achieved at an arbitrary or desired modulation index.

Third Embodiment

Figure 7:
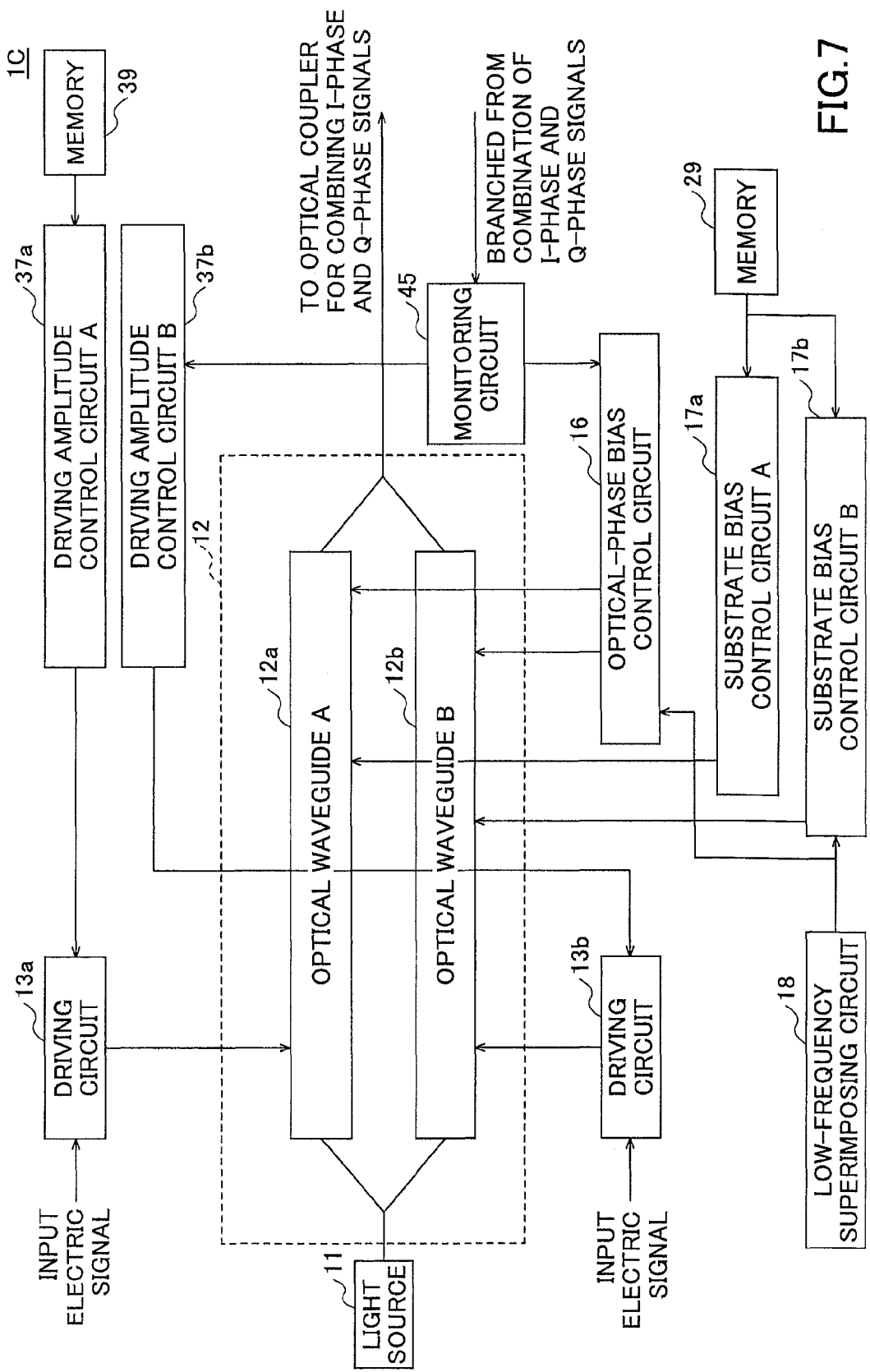
FIG. 7 is a schematic diagram of an optical transmitter according to the third embodiment.

FIG. 7 is a schematic diagram of an optical transmitter 1C, which is an example of an optical communication device, according to the third embodiment. In the third embodiment, the amplitude of a drive signal applied to a pair of waveguides of a Mach-Zehnder interferometer is controlled, in place of the substrate bias voltage. With this arrangement, the modulation index is controlled to a desired value and the output power level is maintained at the optimum level. The amplitude of a drive signal applied to one of the two waveguides set to a level that defines a desired modulation index. The amplitude of a drive signal applied to the other of the waveguides is feedback-controlled so as to minimize the power level of the alternating current component in the output light, whereby the modulation indexes are consistent with each other between the waveguides.

The structure of the optical transmitter 1C is similar to those of the optical transmitters 1A and 1B of the first and second embodiments. Explanation is made to differing points.

Driving circuits 13a and 13b are provided for a pair of waveguides 12a and 12b of the optical transmitter 12. A driving amplitude control circuit 37a is provided for the driving circuit 13a, and a driving amplitude control circuit 37b is provided for the driving circuit 13b. The driving amplitude control circuits 37a and 37b independently carry out control on the driving circuits 13a and 13b.

The driving amplitude control circuit 37a reads an amplitude level that defines a desired value of modulation index from a memory 39, and sets the readout amplitude level in the driving circuit 13a. The memory 39 stores a table or a relational expression describing the relation between modulation index and driving amplitude. The driving amplitude control circuit 37b performs feedback control on the amplitude level of the driving circuit 13b based upon a monitoring result of the output light from the optical modulator 12. The feedback control is carried out such that the modulation index of the light beam through the waveguide 12b is consistent with the modulation index set for the waveguide 12a.

Substrate bias control circuits 17a and 17b are provided for the waveguide 12a and 12b, respectively. The substrate bias control circuits 17a and 17b read a substrate bias value corresponding to the wavelength from a memory 29, and apply a substrate bias voltage of the readout level to the waveguides 12a and 12b. A low frequency superimposing circuit 18 supplies a low frequency signal to the substrate bias control circuit 17b. Accordingly, the substrate bias voltage applied to the waveguide 12b contains a low frequency component. It is not essential to provide the memory 39 and the memory 29 separately. A single memory may be used to store both the amplitude information of a drive signal and the substrate bias information. It is not essential to supply the low frequency signal to the substrate bias control circuit 17b. The low frequency signal may be supplied to the substrate bias control circuit 17a, or the driving amplitude control circuit 37a or 37b. Alternatively, low frequency signals with opposite phases may be supplied to the substrate bias control circuit 17a and 17b, or to the driving amplitude control circuits 37a and 37b.

A monitoring circuit 45 monitors the output light of the optical modulator 12. If the structure of FIG. 7 is applied to QPSK, two Mach-Zehnder interferometers are used as an I-arm optical modulator and a Q-arm optical modulator, and the combined light of I-arm modulated light and Q-arm modulated light is monitored. The output of the monitoring circuit 45 is supplied to the driving amplitude control circuit 37b. The driving amplitude control circuit 37b controls the amplitude of the drive signal applied to the waveguide 12b such that the power of the alternating current component contained in the output of the monitoring circuit 45 is minimized or reduced to or closer to zero.

If the modulation indexes for the light beams propagating through the waveguides 12a and 12b are the same or close to each other, the low frequency component contained in the monitor signal becomes the minimum, and the power of the alternating current component is also the minimum. The driving amplitude control circuit B (37b) compares the phase of the low frequency component detected by the monitoring circuit 45 with the phase of the low frequency signal generated by the low frequency superimposing circuit 18, and controls the driving amplitude of the driving circuit 13b such that the magnitude of the detected low frequency component become the minimum. If the amplitude of the drive signal applied to the waveguide 12b is greater than the optimum level, an in-phase alternating current component is detected in the monitor signal. In this case, the driving amplitude control circuit B (37b) controls the driving circuit 13b so as to decrease the amplitude of the drive signal. If the amplitude of the drive signal applied to the waveguide 12b is smaller than the optimum level, a 180-degree out-of-phase alternating current component is detected in the monitor signal. In this case, the driving amplitude control circuit B (37b) controls the driving circuit 13b so as to increase the amplitude of the drive signal.

This arrangement also achieves a desired modulation index for an optical modulator, while maintaining the output power at the optimum level. The low frequency signal generated in the low frequency superimposing circuit 18 may be supplied to the optical-phase bias control circuit 16 to control the phase difference between the waveguides 12a and 12b in the direction of minimizing the low frequency component contained in the output of the monitoring circuit 45.

Fourth Embodiment

Figure 8:
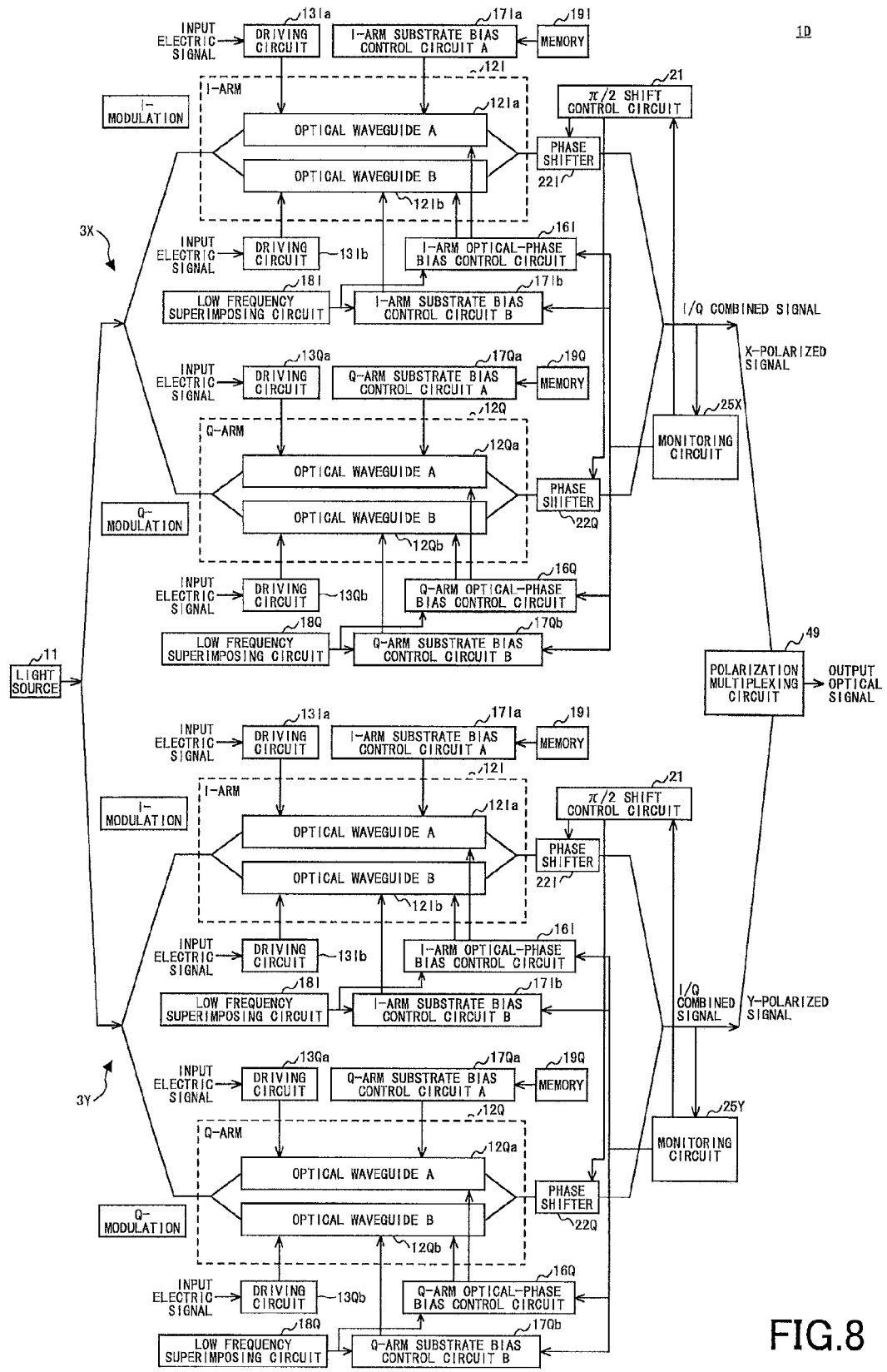
FIG. 8 is a schematic diagram of an optical transmitter according to the fourth embodiment.

FIG. 8 is a schematic diagram of an optical transmitter 1D, which is an example of an optical communication device, according to the fourth embodiment. In the fourth embodiment, the control scheme for the modulation indexes between the waveguide pair of the Mach-Zehnder optical modulator is applied to DP-QPSK. In the following description, the substrate bias voltage is controlled so as to maximize the output power level (or the average light intensity) as in the first embodiment. However, the substrate bias voltage may be controlled so as to minimize the power of the alternating current component in the output light as in the second embodiment, or the driving amplitude may be controlled so as to minimize the power of the alternating current component in the output light as in the third embodiment.

The light emitted from the light source 11 is split into two paths and guided to an X-polarization modulation block 3X and Y-polarization modulation block 3Y. In each of the modulation blocks 3X and 3Y, the light beam is further split into two paths and input to a Mach-Zehnder optical modulator 12I (which may be referred to simply as "I-arm modulator 12I" and a Mach-Zehnder optical modulator 12Q (which may be referred to simply as "Q-arm modulator 12Q"). The X-polarization modulation block 3X and the Y-polarization modulation block 3Y are the same as the modulation block 3 for QPSK illustrated in FIG. 4, and the redundant explanation is omitted. A monitoring circuit 25X is provide for the X-polarization modulation block 3X and a monitoring circuit 25Y is provided for the Y-polarization modulation block 3Y. The substrate bias voltage, the optical-phase bias voltage, and the π/2 shift bias voltage are feedback controlled using a low frequency signal at each of the modulation blocks 3X and 3Y. The bias control on the substrate bias voltage, the optical-phase bias voltage and the π/2 shift bias voltage is similar to that explained in the second embodiment.

X-polarized modulated signal and Y-polarized modulated signal are combined at a polarization multiplexing circuit 49 and output as an optical transmission signal. Instead of providing separate monitoring circuits 25X and 25Y for the respective polarization modulation blocks 3X and 3Y, a portion of the output light from the polarization multiplexing circuit 49 may be monitored.

Fifth Embodiment

Figure 9:
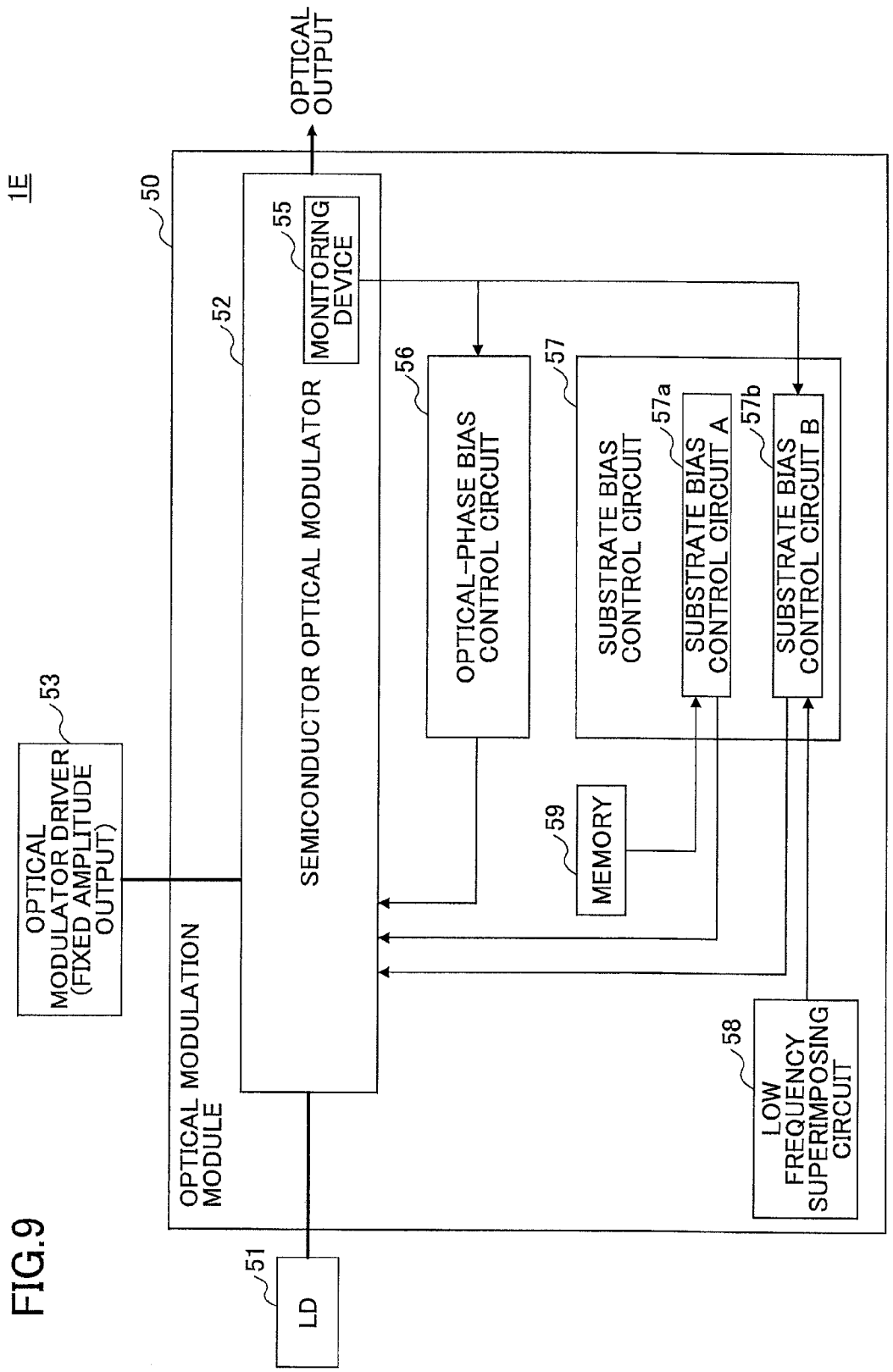
FIG. 9 is a schematic diagram of an optical transmitter according to the fifth embodiment.

FIG. 9 is a schematic diagram of an optical transmitter 1E, which is an example of an optical communication device, according to the fifth embodiment. The optical transmitter 1E has a laser diode (LD) 51 used as a light source, an optical modulator module 50, and a modulator driver 53. In the optical transmitter 1E, a semiconductor optical modulator 52 with a monitoring device 55, an optical-phase bias control circuit 56, a substrate bias control circuit 57, a low frequency superimposing circuit 58, and a memory 59 are accommodated in an optical modulation module 50. The substrate bias control circuit 57 includes substrate bias control circuits 57a and 57b provided corresponding to a pair of waveguides of a Mach-Zehnder interferometer of the semiconductor optical modulator 52. The monitoring circuit 55 has, for example, a photo detector, and converts the detected light signal to an electric signal, which electric signal is supplied to the optical-phase bias control circuit 56 and the substrate bias control circuit 57b. The substrate bias control circuit 57a reads from the memory 59 a substrate bias value fixed in accordance with the wavelength and/or the modulation index, and controls the substrate bias voltage applied to one of the waveguides of the semiconductor optical modulator 52 to the readout level that defines a desired modulation index. The substrate bias control circuit 57b controls the substrate bias voltage applied to the other waveguide so as to bring the modulation indexes to be consistent with each other between the waveguide pair.

Although in this example the optical modulation module 50 is designed based upon the structure of FIG. 2, the QPSK optical modulation block 3 of FIG. 4 may be provided in the optical modulation module 50. In this case, the driving circuits 13Ia, 13Ib, 13Qa, and 13Qb may be provided outside the optical modulation module 50. Alternatively, the DP-QPSK optical modulation block 3X and 3Y and the polarization multiplexing circuit 49 of FIG. 8 may be accommodated in the optical modulation module 50. In either case, a fixed substrate bias level that defines a desired modulation index is selected for one of the two waveguides, and the substrate bias voltage applied to the other waveguide is feedback-controlled such that the modulation indexes for the two waveguides become the same or close to each other. The configuration of FIG. 9 implements the optical transmitter 1E as a compact module that achieves both a desired modulation index and the optimum output power.

Sixth Embodiment

Figure 10:
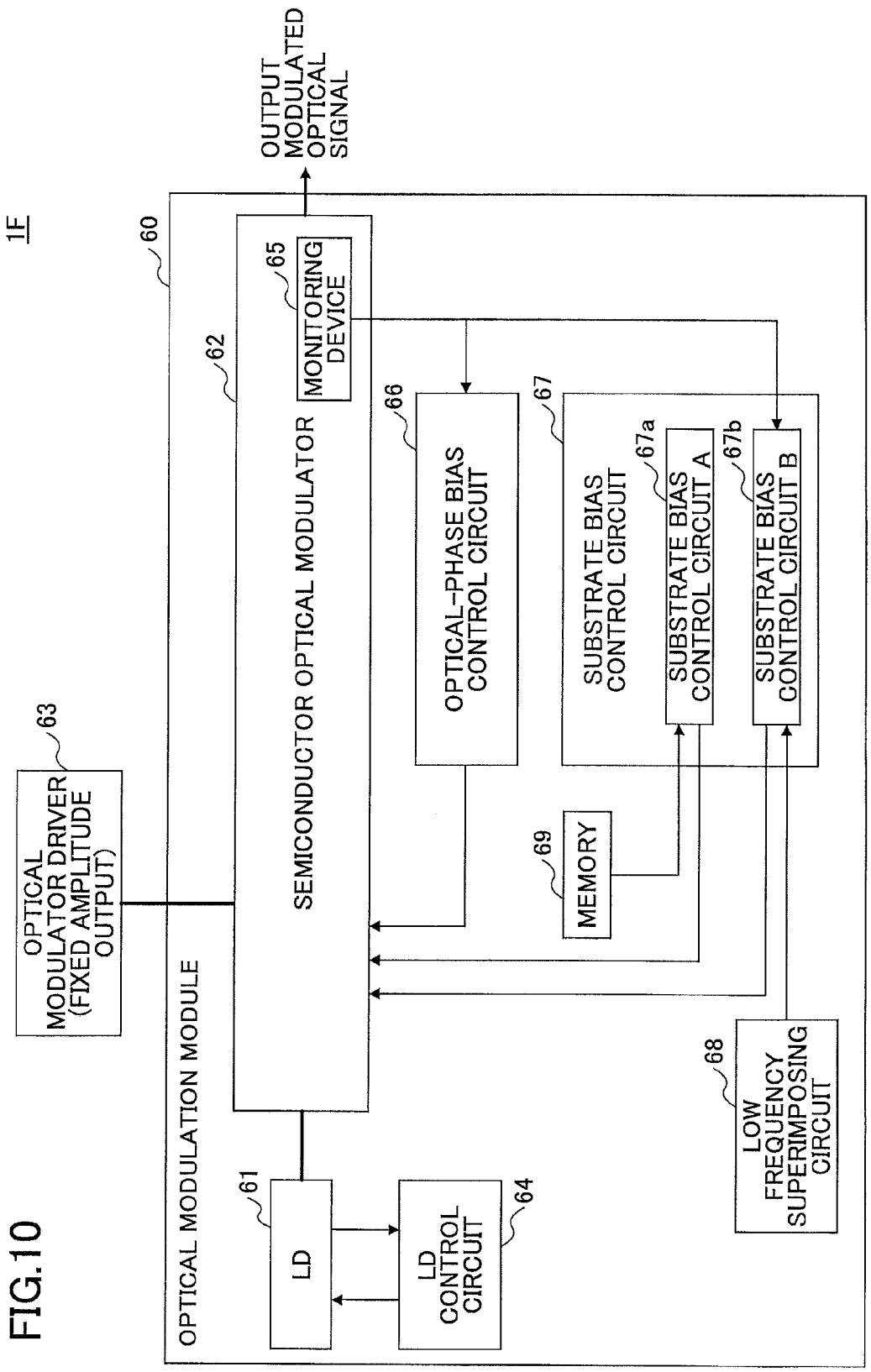
FIG. 10 is a schematic diagram of an optical transmitter according to the sixth embodiment.

FIG. 10 is a schematic diagram of an optical transmitter 1F, which is an example of an optical communication device, according to the sixth embodiment.

In the optical transmitter 1E, a semiconductor optical modulator 62 with a monitoring device 65, an optical-phase bias control circuit 66, a substrate bias control circuit 67, a low frequency superimposing circuit 68, a memory 69, a light source (LD) 61, and a light source (LD) control circuit 64 are accommodated in an optical modulation module 60. This configuration implements the optical modulation module 60 with a built-in light source unit including the light source 61 and the light source control circuit 64.

Although in this example the optical modulation module 60 is designed based upon the structure of FIG. 2, the QPSK optical modulation block 3 of FIG. 4 may be provided in the optical modulation module 60. In this case, the driving circuits 13Ia, 13Ib, 13Qa, and 13Qb may be provided outside the optical modulation module 60. Alternatively, the DP-QPSK optical modulation block 3X and 3Y and the polarization multiplexing circuit 49 of FIG. 8 may be accommodated in the optical modulation module 60.

Seventh Embodiment

Figure 11:
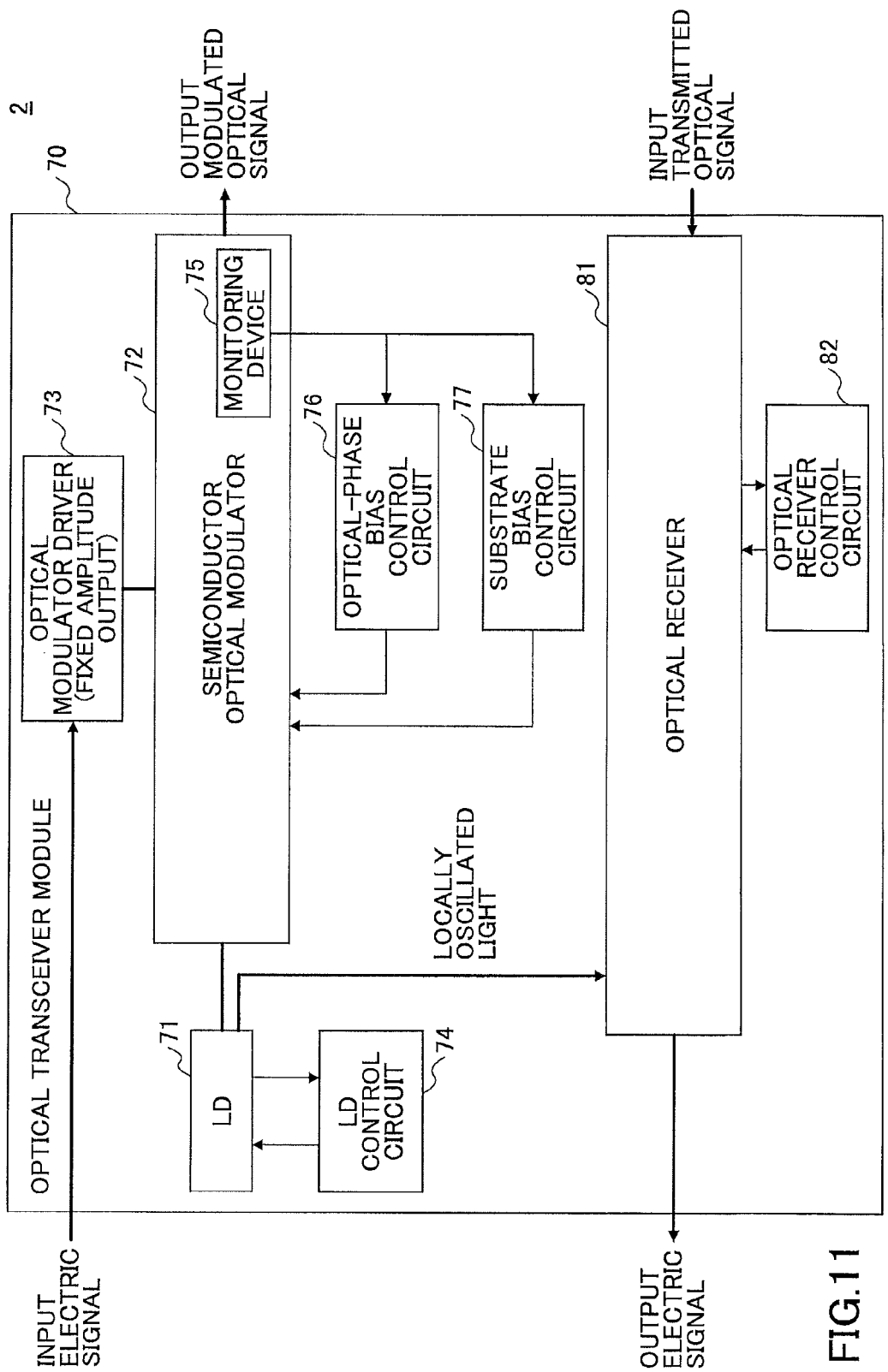
FIG. 11 is a schematic diagram of an optical transceiver according to the seventh embodiment.

FIG. 11 is a schematic diagram of an optical transceiver 2, which is an example of an optical communication device, according to the seventh embodiment. In the optical transceiver 2, a transmission system and a receiving system are accommodated in an optical transceiver module 70. The transmission system includes a semiconductor optical modulator 72 with a monitoring device 75, an optical modulator driver 73, a light source unit, and a bias control unit. The light source unit includes a light source (LD) 71 and a light source (LD) control circuit 74. The bias control unit includes an optical-phase bias control circuit 76 and a substrate bias control circuit 77. The substrate bias control circuit 77 may have independently operating two substrate bias control circuits, a memory connected to one of the substrate bias control circuits, and a low frequency superimposing circuit connected to the other of the substrate bias control circuits, as illustrated in FIG. 9 and FIG. 10.

The receiving system includes an optical receiver 81 and an optical receiver control circuit 82. A portion of the light beam output from the LD 71 is branched and input as a local oscillation light to the optical receiver 81. The optical receiver 81 mixes the received light signal with the local oscillation light to perform coherent light detection. The detected light is subjected to optical-to-electric conversion and current-to-voltage conversion, and an electric signal is output from the optical receiver 81. This configuration implements a compact optical transceiver frontend module.

Although in this example the transmission system of the optical transceiver module 70 is designed based upon the structure of the first embodiment (FIG. 2), the QPSK optical transmitter of FIG. 4 may be used in the optical transceiver module 70. The DP-QPSK optical transmitter of FIG. 8 may also be accommodated in the optical modulation module 70.

Alternatively, as in the third embodiment (FIG. 7), driving amplitude control circuits A and B (37a and 37b) that independently drive the driving circuits 13a and 13b may be provided in the transmission system. In this case, the output of the monitoring device 75 may be connected to the input of the driving amplitude control circuit B.

Throughout the first to the seventh embodiments, the feedback control on the second waveguide B may be performed by controlling the substrate bias or the driving amplitude such that the low frequency component contained in the monitor output becomes the minimum, or such that the average light intensity of the monitor output becomes the maximum, or such that the power of the alternating current component becomes the minimum.

With the structure of any one of the above-described embodiments, the modulation index of the optical modulator can be set to a desired value. Even if a modulation characteristic varies or a different change with time occurs between the two waveguide a Mach-Zehnder interferometer of an optical modulator, the optimum modulation condition can be maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical communication device comprising:
   an optical modulator having a Mach-Zehnder interferometer with a pair of waveguides;
   a monitor configured to monitor a modulated light output from the optical modulator;
   a first controller configured to set a first substrate bias voltage or an amplitude of a first drive signal applied to a first waveguide of the waveguide pair of the optical modulator to a level that provides a first modulation index; and
   a second controller configured to control a second substrate bias voltage or an amplitude of a second drive signal applied to a second waveguide of the waveguide pair of the optical modulator, based upon an output signal from the monitor, such that a second modulation index for the second waveguide becomes the same or closer to the first modulation index set for the first waveguide.

2. The optical communication device according to claim 1,
   wherein a low frequency signal is superimposed on the second substrate bias voltage or the second drive signal applied to the second waveguide, and
   wherein the second controller controls the second substrate bias voltage or the amplitude of the second drive signal so as to minimize a low frequency component contained in the output signal from the monitor.

3. The optical communication device according to claim 1, wherein the second controller controls the second substrate bias voltage or the amplitude of the second drive signal so as to maximize an average light intensity of the output signal from the monitor.

4. The optical communication device according to claim 1, wherein the second controller controls the second substrate bias voltage or the amplitude of the second drive signal so as to minimize a power of an alternating current component of the output signal from the monitor.

5. The optical communication device according to claim 1, further comprising:
   a memory configured to record a relationship between modulation index and substrate bias level or amplitude level of a drive signal,
   wherein the first controller reads the first substrate bias voltage or the amplitude of the first drive signal that provides the first modulation index from the memory.

6. The optical communication device according to claim 1, further comprising:

a driving circuit configured to generate and apply a drive signal to the optical modulator, wherein the optical modulator, the monitor, the first controller, and the second controller are arranged in a single component, and the driving circuit is arranged outside the component.

7. The optical communication device according to claim 6, further comprising:

a light source configured to emit a light beam; and a light source controller configured to control the light source, wherein the light source and the light source controller are arranged inside the component.

8. The optical communication device according to claim 1, further comprising:

a driving circuit configured to generate and apply a drive signal to the optical modulator; and an optical receiver configured to receive a light signal having propagated through an optical transmission path and output an electric signal, wherein the optical modulator, the monitor, the first controller, the second controller, the driving circuit, and the optical receiver are arranged in a single component.

9. A method of controlling an optical modulator, comprising:

setting a first substrate bias voltage or an amplitude of a first drive signal applied to a first waveguide of a pair of waveguides of the optical modulator to a level that provides a first modulation index;

monitoring an output signal of the optical modulator; and controlling a second substrate bias voltage or an amplitude of a second drive signal applied to a second waveguide of the waveguide pair of the optical modulator, based upon an output signal of the optical modulator, such that a second modulation index for the second waveguide becomes the same or closer to the first modulation index set for the first waveguide.

* * * * *